United States Patent
Yu et al.

(10) Patent No.: US 11,357,158 B1
(45) Date of Patent: Jun. 14, 2022

(54) AUTOMATIC GERMINATION EQUIPMENT FOR OAT GRAINS

(71) Applicant: Inner Mongolia Oats House Whole Grain Industry Development Co., Ltd., Hohhot (CN)

(72) Inventors: Zhiquan Yu, Hohhot (CN); Jingjing Dong, Hohhot (CN); Wenzhong Wang, Hohhot (CN); Xiaodong Fan, Hohhot (CN); Jingwei Xiao, Hohhot (CN); Wenduo Li, Hohhot (CN)

(73) Assignee: INNER MONGOLIA OATS HOUSE WHOLE GRAIN INDUSTRY DEVELOPMENT CO., LTD., Hohhot (CN)

( * ) Notice: Subject to any disclaimer, the term of this patent is extended or adjusted under 35 U.S.C. 154(b) by 0 days.

(21) Appl. No.: 17/546,925

(22) Filed: Dec. 9, 2021

(30) Foreign Application Priority Data

Dec. 11, 2020 (CN) .......................... 202011460708.7

(51) Int. Cl.
*A01C 1/02* (2006.01)
*B08B 5/02* (2006.01)

(52) U.S. Cl.
CPC . *A01C 1/02* (2013.01); *B08B 5/02* (2013.01)

(58) Field of Classification Search
CPC .................................. A01C 1/02; A01G 31/02
See application file for complete search history.

(56) References Cited

U.S. PATENT DOCUMENTS

| 4,787,172 | A | * | 11/1988 | Lee | ........................... A01C 1/02 47/16 |
| 5,287,652 | A | * | 2/1994 | Delp | ...................... A01G 31/02 47/79 |
| 2016/0235018 | A1 | * | 8/2016 | Motoyama | ............. A01G 31/02 |
| 2021/0289829 | A1 | * | 9/2021 | Huang | .................... A23P 30/38 |

FOREIGN PATENT DOCUMENTS

KR         102122052 B1 *  6/2020  ............... A01C 1/02

* cited by examiner

*Primary Examiner* — Tien Q Dinh
*Assistant Examiner* — William L Gmoser
(74) *Attorney, Agent, or Firm* — Blank Rome LLP

(57) ABSTRACT

Automatic germination equipment for oat grains includes a plurality of germination accelerating tank bodies each of which is of a hollow structure, a first direction and a second direction are self-defined in each germination accelerating tank body, a plurality of leaching layers are fixedly arranged in each germination accelerating tank body in the first direction, and the leaching layers are fixedly installed on an inner side surface of the germination accelerating tank body; and a reciprocating switch valve device which includes a bottom valve and a rotating lead screw fixedly connected to the bottom valve, the bottom valve is fixedly connected to an outer side surface of the germination accelerating tank body in the first direction, and one end of the rotating lead screw away from the bottom valve passes through the leaching layers in the second direction and extends towards the interior of the germination accelerating tank body.

12 Claims, 4 Drawing Sheets

AUTOMATIC GERMINATION EQUIPMENT FOR OAT GRAINS

CROSS REFERENCE TO RELATED APPLICATION

This patent application claims the benefit and priority of Chinese Patent Application No. 202011460708.7 filed on Dec. 11, 2020, the disclosure of which is incorporated by reference herein in its entirety as part of the present application.

TECHNICAL FIELD

The present disclosure relates to the technical field of mechanical equipment production, in particular relates to automatic germination equipment for oat grains.

BACKGROUND ART

Automatic germination equipment for cereals is suitable for full-automatic assembly line germination production operations of various cereals such as rice, oats, highland barley, wheat, and the like. The technology is stable in production, large in process capacity, and uniform in germination, and the situation that tiled type germination equipment is changed. However, when existing equipment is used for processing the cereals, independent treatment is needed for the technologies such as cleaning, temperature control, dehumidification, dry-wet separation, sewage treatment and the like involved in a cereal processing flow, the involved processing equipment is often excessive in occupied area and cannot be integrally operated, and the existing germination equipment for cereals needs manual feeding and blanking, resulting in the problem of high-strength production operation in the prior art. Therefore, there is an urgent need to design novel automatic germination equipment for cereals, which is capable of automatically treating germination of cereals and integrally integrating auxiliary supports needed for germination of cereals to solve the problems in the prior art.

SUMMARY

An objective of the present disclosure is to provide automatic germination equipment for oat grains. By configuring cooperation relationships among a germination accelerating tank body, a reciprocating switch valve device, a power device, a temperature control device, a sterilization and deodorization device, and a solid-liquid separation device, and by controlling auxiliary equipment needed for controlling germination of grains in a unified mode by a Programmable Logic Controller (PLC), the automatic germination equipment for oat grains is small in occupied area, simple to operate, and capable of assisting germination of cereals in an integrated automatic mode, thereby solving the problems in the prior art. To achieve the objective, automatic germination equipment of oat grains is provided by the present disclosure, including:

a plurality of germination accelerating tank bodies; where each germination accelerating tank body is of a hollow structure, a first direction and a second direction are self-defined in the germination accelerating tank body; a plurality of leaching layers are fixedly arranged in the germination accelerating tank body in the first direction, and the leaching layers are fixedly installed on an inner side surface of the germination accelerating tank body;

a reciprocating switch valve device which includes a bottom valve and a rotating lead screw fixedly connected to the bottom valve, where the bottom valve is fixedly connected to an outer side surface of the germination accelerating tank body in the first direction, and one end of the rotating lead screw away from the bottom valve passes through the leaching layers in the second direction and extends towards an interior of the germination accelerating tank body;

a power device which includes a servo motor, where the servo motor is connected to the rotating lead screw and is fixedly installed on the outer side surface of the germination accelerating tank body to provide power support for the rotating lead screw; and a temperature control device which is fixedly installed on the outer side surface of the germination accelerating tank body to control temperatures of crops stored in the germination accelerating tank body.

As an improvement to the automatic germination equipment of oat grains provided by the present disclosure, a solid-liquid separation device is fixedly installed on the inner side surface of the germination accelerating tank body, a sewage collection box is provided at an end of the solid-liquid separation device away from the germination accelerating tank body, and the sewage collection box is fixedly connected to the germination accelerating tank body.

As an improvement to the automatic germination equipment of oat grains provided by the present disclosure, each leaching layer is provided with two concentric circular members and a plurality of pipes arranged symmetrically on the two concentric circular members, the plurality of pipes are fixedly provided with leaching spray heads and gas spray heads respectively which are connected to an external cleaning device to conduct leaching and air wave cleaning on the crops.

As an improvement to the automatic germination equipment of oat grains provided by the present disclosure, the automatic germination equipment further includes a sterilization and deodorization device, and the sterilization and deodorization device is fixed installed on the inner side surface of the germination accelerating tank body to conduct sterilization, disinfection, and deodorization on the crops.

As an improvement to the automatic germination equipment of oat grains provided by the present disclosure, the automatic germination complete equipment further includes a PLC, the PLC is located at one side outside the germination accelerating tank body, and is respectively connected to the servo motor, the temperature control device, a sterilization and deodorization device and an external cleaning device to conduct temperature control, sterilization, and cleaning on the crops.

As an improvement to the automatic germination equipment of oat grains provided by the present disclosure, the first direction is a transverse direction with respect to the germination accelerating tank body, and the second direction is a longitudinal direction with respect to the germination accelerating tank body.

As an improvement to the automatic germination equipment of oat grains provided by the present disclosure, a model of the PLC is CPM1.

As a second aspect of the present disclosure, it is provided an application of the automatic germination equipment for oat grains in a mechanical equipment production field.

Compared with the prior art, the equipment has the beneficial effects as follows:

by configuring cooperation relationships among the germination accelerating tank body, the reciprocating switch valve device, the power device, the temperature control device, the sterilization and deodorization device and the solid-liquid separation device, and by controlling auxiliary equipment needed for germination of cereals in a unified mode by the PLC, the automatic germination complete equipment for oat grains has the advantages of being small in occupied area, simple to operate, and capable of assisting germination of cereals in an integrated and automatic mode.

List of reference signs: 1 germination accelerating tank body; 2 leaching layer; 3 rotating lead screw; X first direction; Y second direction; 4 sterilization and deodorization device; 5 sewage collection tank; 6 solid-liquid separation device; 7 reciprocating switch valve device; 8 power device; 9 temperature control device.

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the scope of protection of the present disclosure.

In the description of the present disclosure, it should be understood that orientation or positional relationships indicated by terms "upper", "lower", "front", "back", "left", "right", "top", "bottom", "inside", "outside" and the like are based on the orientation or positional relationships shown in the accompanying drawings and are only for convenience of description of the present disclosure and for simplification of description rather than indicating or implying that the device or element referred to must have a particular orientation, be constructed and operated in a particular orientation, and thus are not to be construed as limiting the present disclosure.

The following further describes the present disclosure in detail with reference to the accompanying drawings, but is not intended to be a limitation of the present disclosure.

Figure 1:
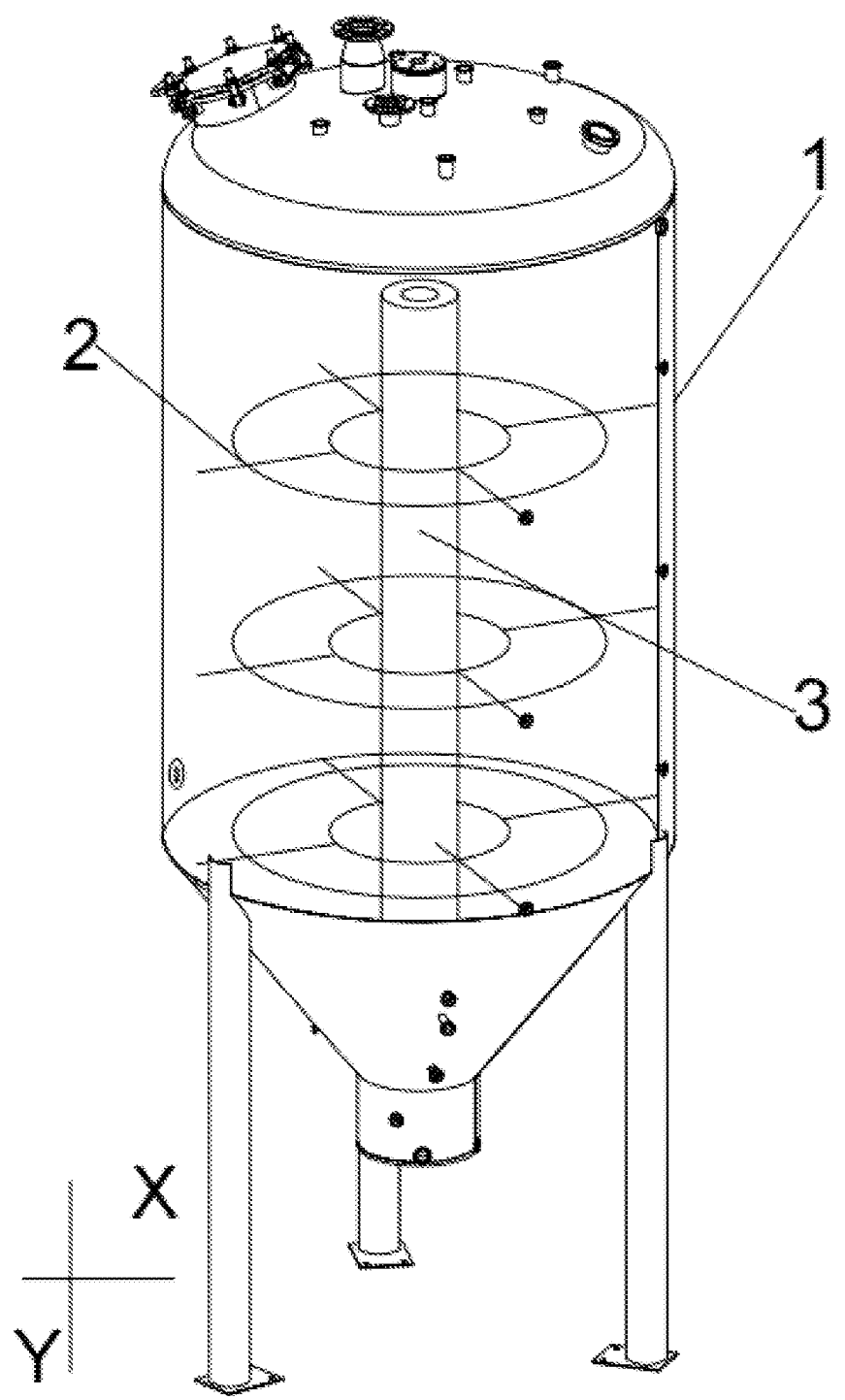
FIG. 1 is a stereoscopic schematic diagram of automatic germination equipment for oat grains according to one embodiment of the present disclosure.
Figure 2:
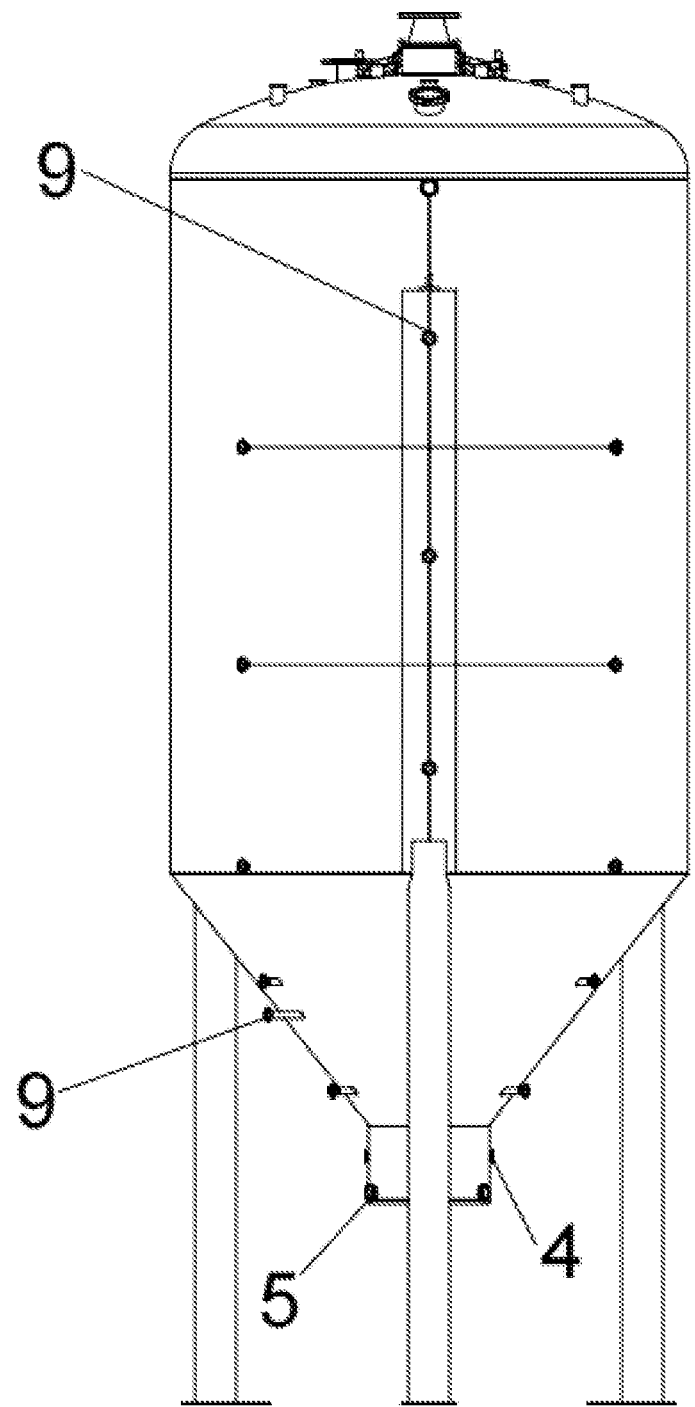
FIG. 2 is a schematic diagram in rear view, of the automatic germination equipment for oat grains according to one embodiment of the present disclosure.
Figure 3:
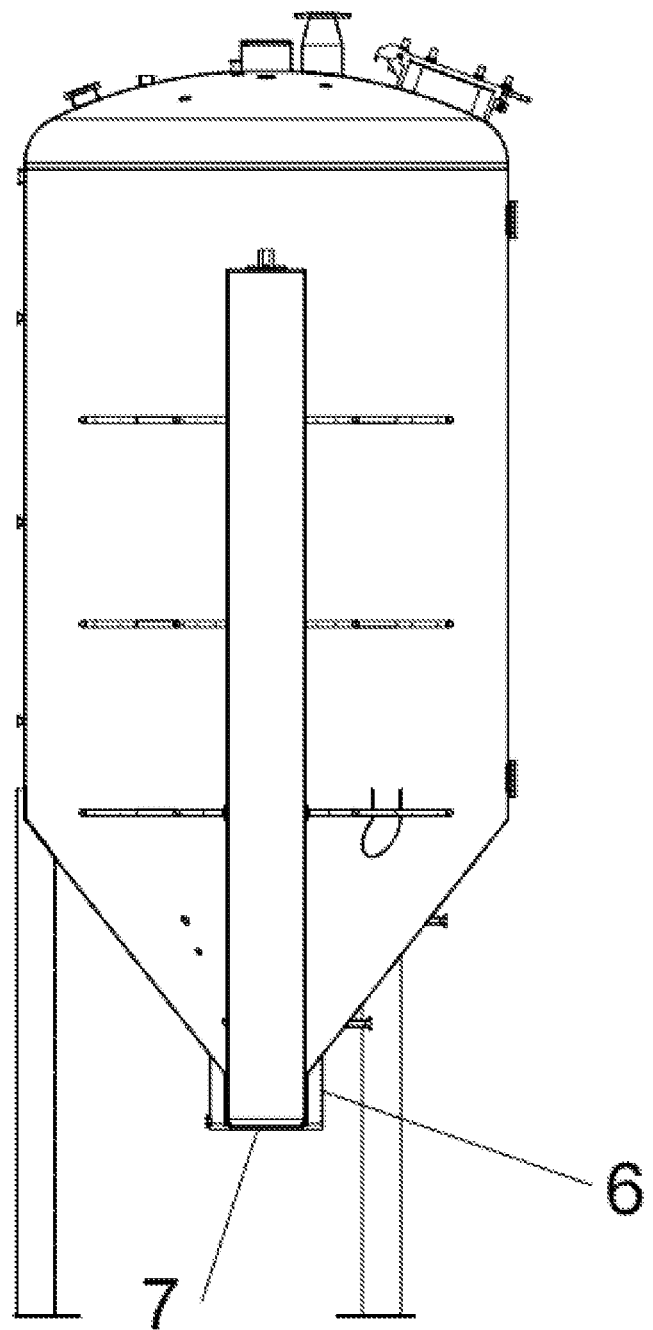
FIG. 3 is a cross-sectional diagram of the automatic germination equipment for oat grains according to one embodiment of the present disclosure.
Figure 4:
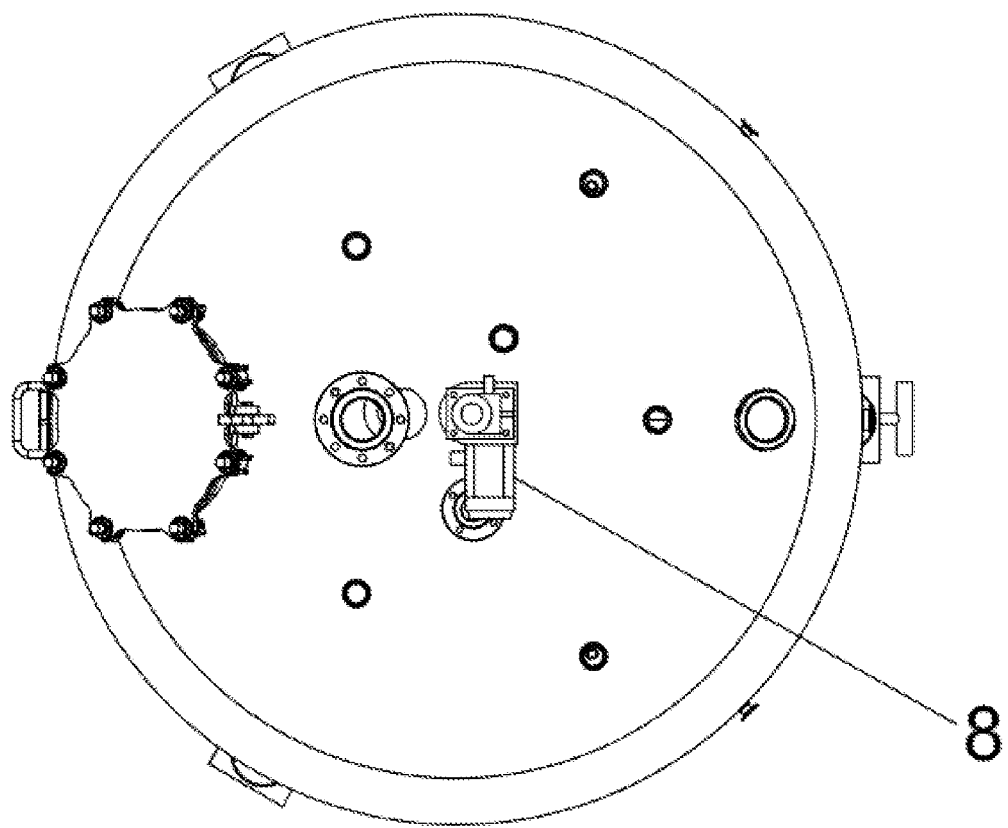
FIG. 4 is a schematic diagram in top view, of the automatic germination equipment for oat grains according to one embodiment of the present disclosure.

As shown in FIG. 1, as one embodiment of the present disclosure, automatic germination equipment for oat grains includes:

a plurality of germination accelerating tank bodies 1, an interior of each germination accelerating tank body 1 is of a hollow structure; a first direction X and a second direction Y are self-defined in each germination accelerating tank body 1, the first direction X and the second direction Y are perpendicular to each other, the first direction X is a transverse direction with respect to the germination accelerating tank body 1, and the second direction Y is a longitudinal direction with respect to the germination accelerating tank body 1; a plurality of leaching layers 2 are fixedly arranged on an inner side surface of the germination accelerating tank body 1 at intervals in the second direction Y, each leaching layer 2 is provided with two concentric circular members and a plurality of pipes arranged symmetrically on the two concentric circular members; the plurality of pipes are provided with leaching spray heads and gas spray heads respectively; the pipes are connected to an external cleaning device to conduct leaching and air wave cleaning on crops, and the leaching layers 2 are fixedly installed on the inner side surface of the germination accelerating tank body 1; a solid-liquid separation device 6 is fixedly installed on the inner side surface of the germination accelerating tank body 1, a sewage collection tank 5 is provided at an end of the solid-liquid separation device 6 away from a joint between the germination accelerating tank body 1 and the solid-liquid separation device 6, and the sewage collection tank 5 is fixedly connected to the germination accelerating tank body 1; a sterilization and deodorization device 4 is fixedly installed on the inner side surface of the germination accelerating tank body 1 to conduct sterilization, disinfection, and deodorization on the crops; and furthermore, a liquid level sensor is arranged in the sterilization and deodorization device, the liquid level sensor is connected to a PLC sensor to conduct depth self-inspection self-control on the water current in the germination accelerating tank body 1;

a reciprocating switch valve device 7 which comprises a bottom valve and a rotating lead screw 3 fixedly connected to the bottom valve; the bottom valve is fixedly connected to an outer side surface of the germination accelerating tank body 1 in the first direction X, and one end, away from the bottom valve, of the rotating lead screw 3 passes through the leaching layers 2 in the second direction Y and extends towards the interior of the germination accelerating tank body 1; where the rotating lead screw 3 is of a hollow core, the bottom valve is in a closed state during feeding, and after the crops are well treated, the rotating lead screw 3 lifts the bottom valve for blanking;

a power device 8 which includes a servo motor, the servo motor is connected to the rotating lead screw 3, and is fixedly arranged on the outer side surface of the germination accelerating tank body 1 to provide power support for the rotating lead screw 3; and a temperature control device 9 which is fixedly installed on the outer side surface of the germination accelerating tank body 1 to conduct temperature control adjustment on the crops stored in the germination accelerating tank body 1, so that the crops in the germination accelerating tank body 1 is guaranteed to absorb oxygen.

As one embodiment of the present disclosure, the model of the PLC is CPM1, and the model of the liquid level sensor is KGU9901.

As one embodiment of the present disclosure, application of the automatic germination equipment for oat grains in the field of mechanical equipment production is provided; by configuring cooperation relationships among the germination accelerating tank body 1, the reciprocating switch valve device 7, the power device 8, the temperature control device 9, the sterilization and deodorization device 4 and the solid-liquid separation device 6, and by controlling auxiliary equipment needed for germination of cereals in a unified mode by the PLC, the automatic germination equipment for oat grains has the advantages of being small in occupied area, simple to operate, and capable of assisting germination of cereals in an integrated automatic mode.

In one embodiment of the present disclosure, an external raw grain bin is connected to a grain feeder through a grain pumping pipeline, the grain feeder is connected into a feeding port at the upper end of the germination accelerating tank body 1, the grains enter the germination accelerating tank body 1 to achieve a cleaning operation of the grains in the germination accelerating tank body 1. The grains are subjected to multi-angle leaching and airflow surge type convection cleaning in the germination accelerating tank body 1 through the leaching spray heads and the gas spray heads, thereby guaranteeing the cleaning degree of the grains. Furthermore, through the solid-liquid separation device 6, the sewage after cleaning is discharged to the sewage collection tank, but the solid grains cannot be discharged. Through intelligent automatic constant temperature control ability, each grain can absorb proper oxygen; and through intelligent control sterilization, disinfection and deodorization functions, the crops can be sterilized, disinfected and deodorized. In addition, the bottom valve is in a closed state during feeding, and after the crops are well treated, the PLC drives the servo motor, the servo motor drives the rotating lead screw 3 to lift the bottom valve for blanking, thus completing one-time germination of cereals.

As another embodiment of the present disclosure, windows are fixedly formed in the plurality of germination accelerating tank bodies for a worker to conduct visual inspection on operating states inside the plurality of germination accelerating tank bodies, and connecting flanges are fixedly formed in the plurality of germination accelerating tank bodies for being connected to an external spray-washing water source to clean grains. A sanitary loose-joint sight glass is arranged at one end, away from the joint with each germination accelerating tank body, of the connecting flange for detecting the sealing performance of the germination accelerating tank body and the connecting state between the connecting flange and the germination accelerating tank body.

The basic principles and principal characters of the present disclosure and advantages of the present disclosure are shown and described above, and it is apparent to those skilled in the art that the present disclosure is not limited to the details of the exemplary embodiments described above, and that the present disclosure may be embodied in other specific forms without departing from the spirit or essential characters of the present disclosure. Therefore, in any way, the embodiments should be regarded as exemplary, not limitative; and the scope of the present disclosure is limited by the appended claims, instead of the above description. Thus, all variations falling into the meaning and scope of equivalent elements of the claims are intended to be embraced within the present disclosure. Any reference signs in the claims shall not be regarded as limitations to the concerned claims.

In addition, it should be understood that: although the description is described in terms of embodiments, each embodiment does not include only one independent technical solution, such description manner of the description is merely for clarity purposes, and those skilled in the part should take the description as a whole. The technical solutions in the various embodiments may also be properly combined to form other embodiments that may be understood by those skilled in the art.

What is claimed is:

1. Automatic germination equipment for oat grains, comprising:
   a plurality of germination accelerating tank bodies, wherein each germination accelerating tank body is of a hollow structure, a first direction and a second direction are self-defined in the germination accelerating tank body; a plurality of leaching layers are fixedly arranged in the germination accelerating tank body at intervals in the second direction, and the leaching layers each are fixedly installed on an inner side surface of the germination accelerating tank body;
   a reciprocating switch valve device which comprises a bottom valve and a rotating lead screw fixedly connected to the bottom valve, wherein one end of the rotating lead screw away from the bottom valve passes through the leaching layers in the second direction and extends towards an interior of the germination accelerating tank body, and wherein actuation of the rotating lead screw causes the bottom valve to transition between an open position and a closed position;
   a power device which comprises a servo motor, wherein the servo motor is connected to the rotating lead screw and is fixedly installed at the outer side surface of the germination accelerating tank body to provide power support for the rotating lead screw and actuate the rotating lead screw; and
   a temperature control device which is fixedly installed at the outer side surface of the germination accelerating tank body to control temperatures of crops stored in the germination accelerating tank body.

2. The automatic germination equipment for oat grains according to claim 1, wherein a solid-liquid separation device is fixedly installed on the inner side surface of the germination accelerating tank body, a sewage collection box is provided at an end of the solid-liquid separation device away from the germination accelerating tank body, and the sewage collection box is fixedly connected to the germination accelerating tank body.

3. The automatic germination equipment for oat grains according to claim 1, wherein each leaching layer is provided with two concentric circular members, and a plurality of pipes arranged symmetrically on the two concentric circular members, the plurality of pipes are fixedly provided with leaching spray heads and gas spray heads respectively which are connected to an external cleaning device to conduct leaching and air wave cleaning on the crops.

4. The automatic germination equipment for oat grains according to claim 1, further comprises a sterilization and deodorization device, and the sterilization and deodorization device is fixed installed on the inner side surface of the germination accelerating tank body to conduct sterilization, disinfection, and deodorization on the crops.

5. The automatic germination equipment for oat grains according to claim 1, further comprises a Programmable Logic Controller (PLC), the PLC is located at one side outside the germination accelerating tank body, and is respectively connected to the servo motor, the temperature control device, a sterilization and deodorization device and an external cleaning device to conduct temperature control, sterilization, and cleaning on the crops.

6. The automatic germination equipment for oat grains according to claim 1, wherein the first direction and the second direction are perpendicular to each other, the first direction is a transverse direction with respect to the germination accelerating tank body, and the second direction is a longitudinal direction with respect to the germination accelerating tank body.

7. An application of an automatic germination equipment for oat grains in a mechanical equipment production field, wherein the automatic germination equipment comprises:

a plurality of germination accelerating tank bodies, wherein each germination accelerating tank body is of a hollow structure, a first direction and a second direction are self-defined in the germination accelerating tank body; a plurality of leaching layers are fixedly arranged in the germination accelerating tank body in the first direction, and the leaching layers are fixedly installed on an inner side surface of the germination accelerating tank body;

a reciprocating switch valve device which comprises a bottom valve and a rotating lead screw fixedly connected to the bottom valve, wherein one end of the rotating lead screw away from the bottom valve passes through the leaching layers in the second direction and extends towards an interior of the germination accelerating tank body, and wherein actuation of the rotating lead screw causes the bottom valve to transition between an open position and a closed position;

a power device which comprises a servo motor, wherein the servo motor is connected to the rotating lead screw and is fixedly installed at the outer side surface of the germination accelerating tank body to provide power support for the rotating lead screw and actuate the rotating lead screw; and a temperature control device which is fixedly installed at the outer side surface of the germination accelerating tank body to control temperatures of crops stored in the germination accelerating tank body.

8. The application of the automatic germination equipment for oat grains according to claim 7, wherein a solid-liquid separation device is fixedly installed on the inner side surface of the germination accelerating tank body, a sewage collection box is provided at an end of the solid-liquid separation device away from the germination accelerating tank body, and the sewage collection box is fixedly connected to the germination accelerating tank body.

9. The application of the automatic germination equipment for oat grains according to claim 7, wherein each leaching layer is provided with two concentric circular members, and a plurality of pipes arranged symmetrically on the two concentric circular members, the plurality of pipes are fixedly provided with leaching spray heads and gas spray heads respectively which are connected to an external cleaning device to conduct leaching and air wave cleaning on the crops.

10. The application of the automatic germination equipment for oat grains according to claim 7, wherein the automatic germination equipment for the oat grains further comprises a sterilization and deodorization device, and the sterilization and deodorization device is fixed installed on the inner side surface of the germination accelerating tank body to conduct sterilization, disinfection, and deodorization on the crops.

11. The application of the automatic germination equipment for the oat grains according to claim 7, wherein the automatic germination equipment for the oat grains further comprises a Programmable Logic Controller (PLC), the PLC is located at one side outside the germination accelerating tank body, and is respectively connected to the servo motor, the temperature control device, a sterilization and deodorization device and an external cleaning device to conduct temperature control, sterilization, and cleaning on the crops.

12. The application of the automatic germination equipment for the oat grains according to claim 7, wherein the first direction and the second direction are perpendicular to each other, the first direction is a transverse direction with respect to the germination accelerating tank body, and the second direction is a longitudinal direction with respect to the germination accelerating tank body.

* * * * *